April 21, 1959 C. J. COBERLY 2,882,960
NOZZLE ASSEMBLY
Filed Nov. 8, 1954 3 Sheets-Sheet 1
Fig. I
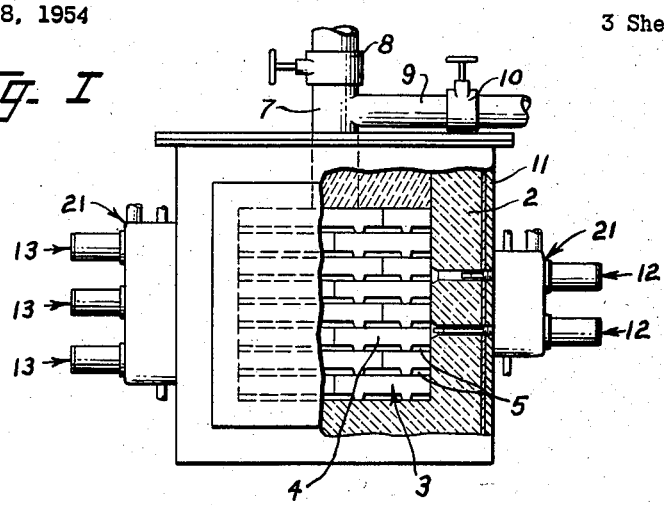
Fig. II
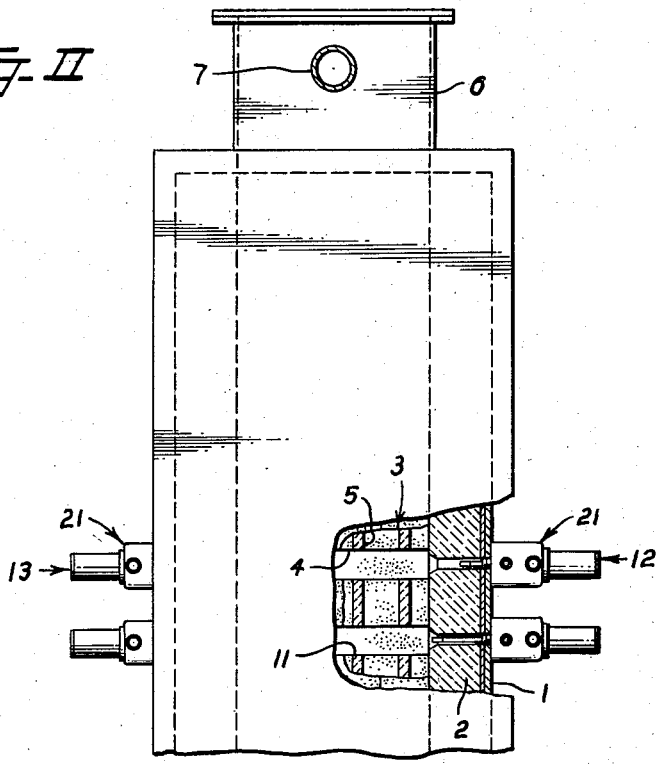
INVENTOR
CLARENCE J. COBERLY
BY HIS ATTORNEYS
HARRIS, KIECH, FOSTER & HARRIS April 21, 1959
C. J. COBERLY
2,882,960
NOZZLE ASSEMBLY
Filed Nov. 8, 1954
3 Sheets-Sheet 2
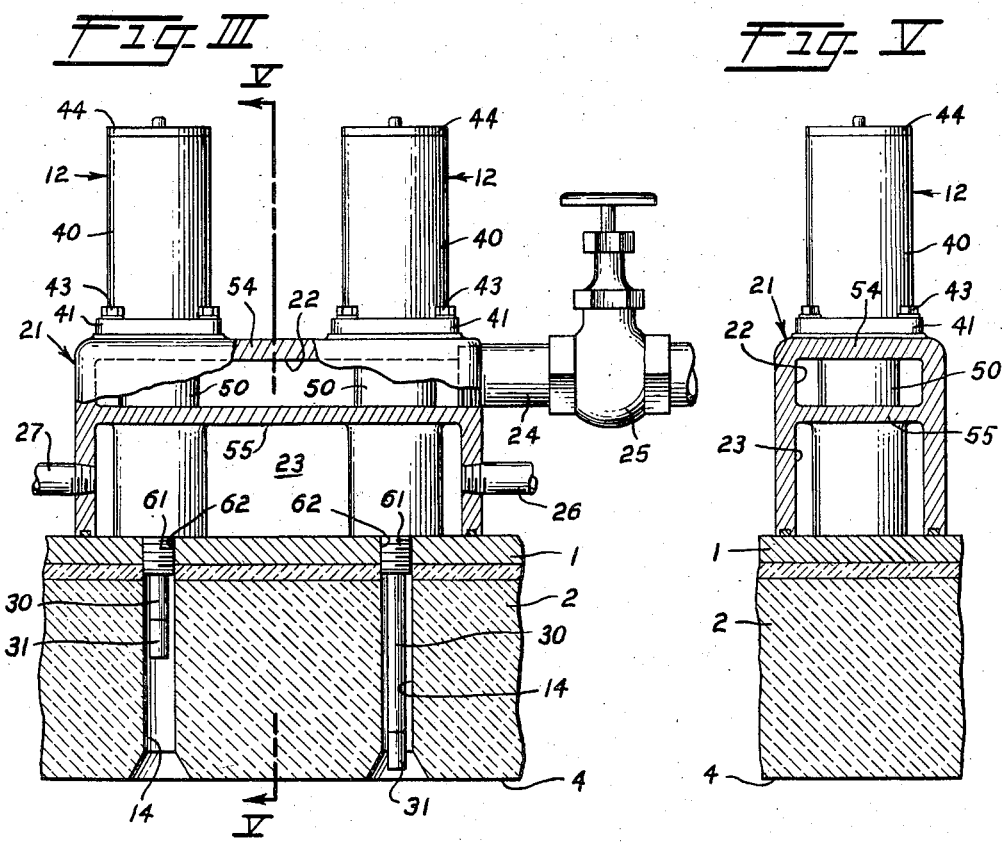
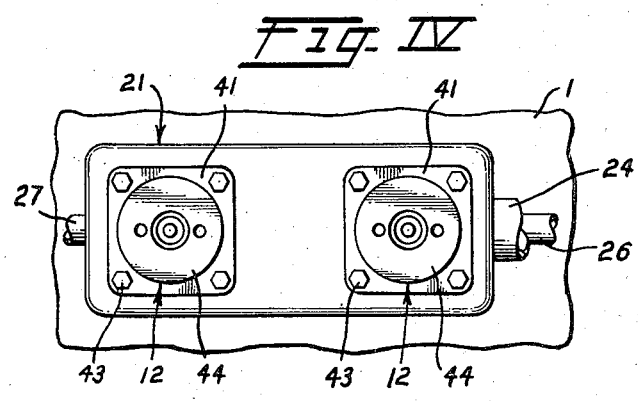
INVENTOR
CLARENCE J. COBERLY
BY HIS ATTORNEYS
HARRIS, KIECH, FOSTER & HARRIS

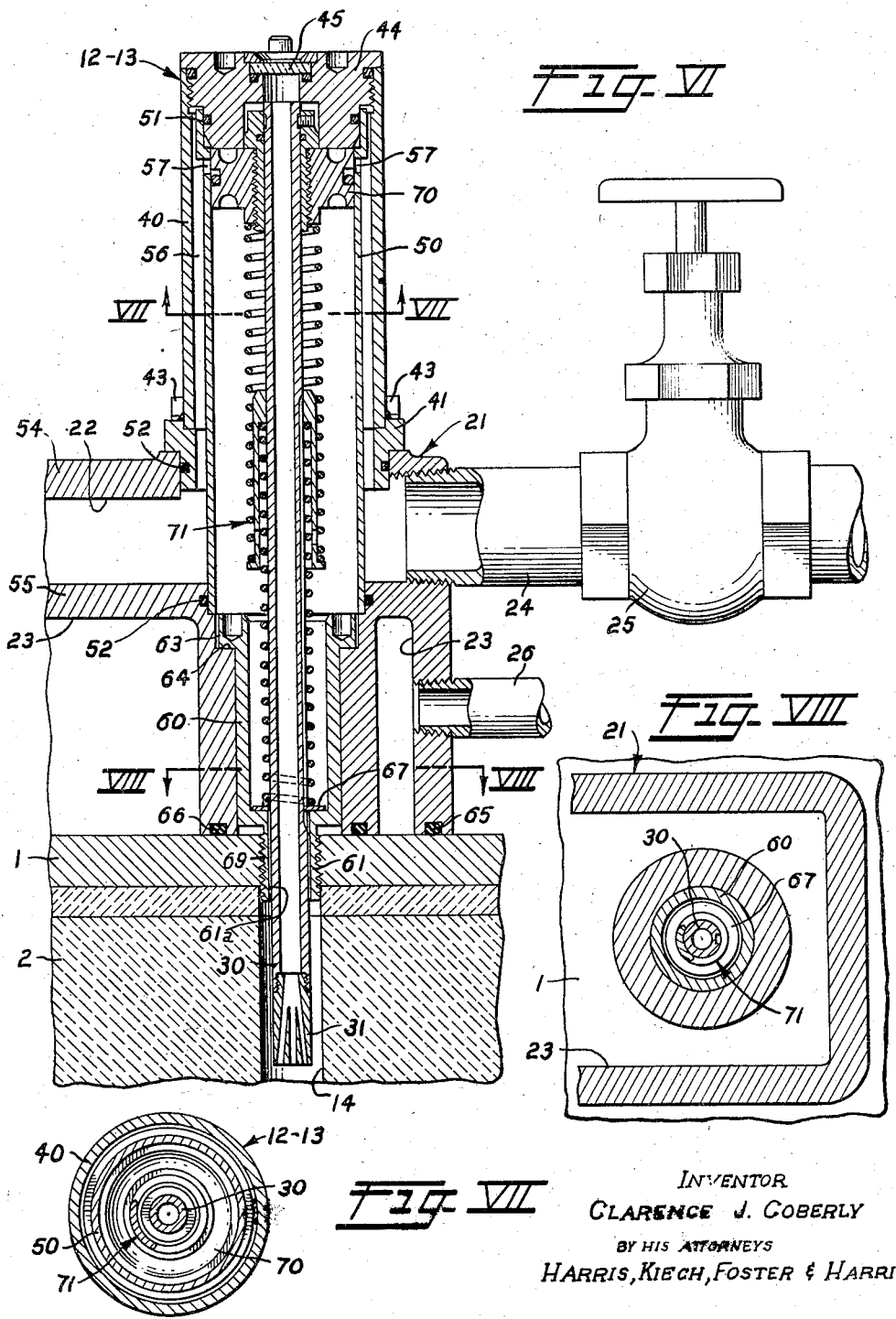

United States Patent Office 2,882,960
Patented Apr. 21, 1959

2,882,960

NOZZLE ASSEMBLY

Clarence J. Coberly, San Marino, Calif., assignor to Wulff Process Company, Huntington Park, Calif., a corporation of California Application November 8, 1954, Serial No. 467,536

13 Claims. (Cl. 158—7)

The invention claimed herein may be briefly summarized as a nozzle assembly by which a fuel gas may be delivered to the combustion chamber of a furnace. This gas is delivered to said chamber intermittently through holes in the wall of the chamber by burner tubes each having a nozzle means being provided for automatically moving said nozzles towards said chamber when the flow of fuel gas starts and for automatically moving said nozzles away from said chamber when the flow of fuel gas stops.

My invention has a special utility when applied to a furnace having regenerative masses, the process being operated in a cycle consisting of a "heat" step in which these masses are heated by combustion of fuel gas which flows into a combustion chamber, the flow of fuel gas being then shut off to allow a "make" step during which certain pyrolytic actions may occur in the furnace.

The nature of the invention and the advantages flowing from it will be better understood after consideration of the following specification and the drawings in which:

Fig. I shows an end elevation of a regenerative furnace, a portion thereof being broken away to better illustrate the use of the invention;

Fig. II is a partial plan view similarly broken away;

Fig. III is a side view partly in section showing two jet manifolds as applied to the shell of a furnace;

Fig. IV is a plan view of the manifolds shown in Fig. III;

Fig. V is a section on a plane represented by line V—V in Fig. III;

Fig. VI is a central cross section of a nozzle assembly showing the method of securing the parts together and to the furnace shell;

Fig. VII is a section on a plane defined by the line VII—VII of Fig. VI; and

Fig. VIII is a section on a plane defined by the line VIII—VIII of Fig. VI.

The furnace consists of a gas-tight steel shell 1 having a heat refractory lining 2 and two regenerative masses 3 situated in each end of the furnace and adjacent to a central combustion space 4. The regenerative mass 3 has a large number of small channels 5 extending therethrough. Open spaces are provided in extensions 6 at the ends of the furnace and during the "heat" step of the cycle air may be forced into this space from an air pipe 7 having a valve 8. This air moves at high velocity through the channels 5 and passes as high velocity jets into the combustion space 4. During the "make" step the valve 8 is closed and some other gas, for example propane, is passed into the furnace through a pipe 9 having a valve 10.

It is an object of the invention to pass a plurality of high pressure jets of fuel gas consisting, for example, of natural gas or some other mixture of gases having a high fuel value, into the combustion space 4, said jets being projected close to the inner faces of the masses 3 substantially at right angles to the channels 5. There may be, in fact, several combustion spaces, one of which is shown at 11 in Fig. II. The jets are preferably injected into the combustion spaces 4 and 11 from both sides of the furnace in such a manner that a jet from either side of the furnace does not impinge directly on a jet from the opposite side of the furnace. As shown in Fig. I, there are two jet assemblies 12 on the right-hand side of the furnace and three jet assemblies 13 on the other side of the furnace, the jets on one side being staggered from the jets on the other side, there being five jets for the combustion chamber 4 and a similar number for the combustion chamber 11. The jets are introduced into the furnace through holes 14 which extend through the shell 1 and lining 2.

The object of the construction above described is to provide a very rapid and complete mixing of the fuel gas with very hot air coming from the channels 5. The rapidity of the resulting combustion is a factor in the efficiency of the process, which is ordinarily carried on in a vacuum of perhaps 15″ of water.

At each side of the furnace outside the shell 1 is mounted a manifold 21. The right-hand manifold as seen in Fig. I carries two jet assemblies 12 and the left-hand manifold carries three jet assemblies 13. Each of these manifolds 21 (Fig. III) consists of a casting having a closed fuel gas chamber 22 and an open water chamber 23. The water chamber 23 is open to the extent that the shell 1 on which the manifold is secured forms one side of the wall of the water chamber 23. Fuel gas is supplied to the fuel gas chamber 22 through a fuel gas pipe 24 having a fuel gas valve 25. This fuel gas valve 25 is open only during the heat step of the process. Cold water is circulated into the chamber 23 by a water inlet pipe 26 and the heated water is removed through a water outlet pipe 27.

Certain necessary objects are attained by the above described apparatus. The fuel gas must be ejected at high velocity into the combustion chamber 4, which is under vacuum and at a temperature which may be as high as 3000° F. This fuel gas is ejected through burner tubes 30 having nozzles 31. The holes 14 are, of course, open at all times to the high temperature gas in the chamber 4 and to radiation from the incandescent walls of the chamber. This tends to make hot spots in the shell 1 around the outer ends of the holes 14. Water from the chamber 23 tends to cool the shell and to a substantial degree prevent these hot spots.

The nozzles 31 should be close to the chamber 4, as shown to the right in Fig. III, as gas is injected into the chamber 4. A great deal of expense was incurred in attempting to make a nozzle that would stand up in this position as only ceramic nozzles seemed suitable. These nozzles cracked under heat and the holes therein tended to glaze over. It was found that as long as there was a substantial flow of cold gas through the nozzle, a metal nozzle was cooled sufficiently to resist damage. It was decided to use a metal nozzle 31, and to provide efficient water cooling about the burner tube 30 and the shell 1 about the hole 14, and to pull the nozzle 31 back into the position shown at the left in Fig. III whenever cold gas was not flowing through the nozzle. Nozzles so constructed and actuated give no trouble. The mechanism by which the nozzle 31 is moved in the hole 14 is shown in Figs. VI, VII and VIII. It is moved towards the combustion chamber 4 by the pressure of the fuel gas in the chamber 22 which is built up due to pressure drop in the burner tube 30 as gas is ejected from the nozzle 31 and which occurs whenever the fuel valve 25 is opened and gas is jetted into the combustion chamber 4 from the nozzle 31. The nozzle is retracted into the cooler portion of the hole 14 by spring action, as will be later described, whenever the valve 25 is closed and the pressure in the gas chamber 22 falls.

Each nozzle assembly includes an outer cylinder 40 which is welded in gas-tight relationship to a flange 41 which is bolted in gas-tight relationship to a boss on the manifold 21 by bolts 43 shown in Fig. IV. The outer end of the outer cylinder 40 is closed by a cylinder cap 44 having a sight glass 45 through which the interior of the outer cylinder 40 may be inspected. Abutting against the cap 44 at its outer end and in an opening in the casting at its lower end is an inner cylinder 50 which is gas-tight due to an O-ring 51 at the upper end and to an O-ring 52 at its lower end. It should be noted that the outer cylinder 40 abuts against the flange 41 while the inner cylinder abuts against an inner wall 55 of the manifold. The space 56 between the outer cylinder 40 and the inner cylinder 50 is at all times in open communication with the fuel gas chamber 22 so that the pressure of the gas in the space 56 is controlled by the gas valve 25. A restricted opening 57 in the wall of the inner cylinder admits the fuel gas into the upper end of the space inside the inner cylinder 50. Cooling water from the water chamber 23 cannot enter the nozzle assembly proper but, of course, cools the fuel gas contained therein.

The manifold 21 is held solidly against the outer surface of the shell 1 by two or more retainer bushings 60, one end 61 of each being threaded in a threaded hole 62 in the shell 1, which hole is concentric with the axis of the hole 14. The other end of the retainer bushing 60 has a head 63 which abuts against a shoulder 64 in the manifold 21. O-rings 65 and 66 in the manifold 21 insure a tight water chamber 23. The burner tube 30 projects through the bushing 60 and has a keyway engaged by a projection on a washer 67 for aligning the nozzle 31 radially. The burner tube 30 is of somewhat smaller outside diameter than the hole in the bushing 60 through which the tube 30 passes so that there may be a restricted flow of gas through the space between the tube and the hole.

Rigidly secured on the upper end of the burner tube 30 is a piston 70 which slides freely in gas-tight relationship in the inner cylinder 50 due to the O-ring shown, this O-ring being in a groove dividing the piston surface into upper and lower lands having a sliding fit with the cylinder wall. The hole 57 is so placed that it feeds gas through the clearance between the upper land and the cylinder wall into the space inside the inner cylinder 50 and above the piston 70. The piston is forced upwardly as seen in Fig. VI by a compression spring assembly 71, the spring abutting at its lower end against the retainer bushing 60 and at its upper end against the piston 70. The spring surrounds and is guided by the burner tube 30 which provides an open communication between the space above the piston 70 and the upper end of the inner cylinder 50 and the method of operation of the apparatus above described is as follows.

The furnace being in operation under a partial vacuum and the valve 25 being closed, water is supplied through the pipe 26. The valve being closed, the pressure on the piston 70 is equalized, the pressure below the piston being equalized with the pressure in the combustion chamber 4 through a passage 61a in the bushing end 61 and pressure above the piston being equalized with combustion chamber pressure through the burner tube 30. The spring assembly thus holds the piston in the upper end of the inner cylinder as shown in Fig. VI. The nozzle 31 is then held in its retracted position as shown to the left of Fig. III. In this position the nozzle 31 is in a relatively cool spot remote from the combustion chamber 4.

If, however, fuel gas at atmospheric or superatmospheric pressure is applied to the top of the piston 70, it is forced downwardly, the nozzle 31 being forced into a position near the combustion chamber 4, as shown to the right in Fig. III. This gas ordinarily is at atmospheric temperature but may be artificially cooled before it passes the valve 25. It is, therefore, a very efficient cooling agent for the nozzle 31, as long as the flow of gas continues which may be, for example, several minutes. When, however, the flow of gas is shut off by closing the valve 25, the vacuum in the combustion chamber acts to equalize the pressure on the piston and the piston resumes the retracted position shown in Fig. VI, the nozzle 31 also being withdrawn to its retracted position. In actual cyclic operation, the valve 25 is, of course, power operated by a timing device. Words expressing position, such as "up and down," refer to the position shown in Fig. VI.

I claim as my invention:

1. A combination of elements, including: a shell enclosing a high temperature chamber; a heat refractory lining inside said shell and surrounding said chamber, there being an open hole extending through said shell and said lining to said chamber; a manifold secured against the outer surface of said shell over said hole, said manifold having a fuel gas chamber and having a water chamber adjacent to said shell for cooling the latter; water piping to circulate cooling water through said water chamber; a fuel gas pipe to deliver fuel gas to said gas chamber; a fuel gas valve through which fuel gas may be delivered to said fuel gas pipe; an outer cylinder axially aligned with said hole; a cylinder cap closing the outer end of said cylinder; an inner cylinder axially aligned with said hole and inside said outer cylinder and having an inner end and an outer end and providing an annular space between said cylinders, said gas chamber being in communication with said annular space; a retainer bushing closing the inner end of said inner cylinder; a piston sliding in said inner cylinder, there being an open communication between the space between said cylinders and the space in said inner cylinder between said piston and said cylinder cap; a burner tube extending through said piston in which it is rigidly secured and through said retainer bushing into said open hole; spring means tending to force said burner tube out of said hole; and a nozzle secured to the inner end of said burner tube.

2. A combination of elements, including: a shell enclosing a high temperature chamber; a heat refractory lining inside said shell and surrounding said chamber, there being an open hole extending through said shell and said lining; a manifold secured against the outer surface of said shell over said hole, said manifold having a fuel gas chamber and having a water chamber adjacent to said shell to cool said shell around said hole; water piping so placed as to circulate cooling water through said water chamber; a fuel gas pipe so placed as to deliver fuel gas to said gas chamber; a fuel gas valve through which fuel gas may be delivered to said fuel gas pipe; an outer cylinder axially aligned with said hole; a cylinder cap closing the outer end of said cylinder; an inner cylinder axially aligned with said hole and inside said outer cylinder and having an inner end and an outer end and providing an annular space between said cylinders, said gas chamber being in communication with said annular space; a retainer bushing in said manifold adjacent said shell and closing the inner end of said inner cylinder, said retainer bushing being surrounded by a wall portion of said manifold, the outer surface of which extends through and is cooled by the water in said water chamber, said retainer bushing having a projection entering said hole in said shell and securing said manifold to said shell; a piston sliding in said inner cylinder, there being an open communication between the space between said cylinders and a space at the outer end of said inner cylinder between said piston and said cylinder cap; a burner tube extending through said piston in which it is rigidly secured and through said retainer bushing into said open hole; spring means tending to force said piston into the outer end of said inner cylinder and said burner tube out of said hole; and a nozzle secured to the inner end of said burner tube.

3. In a furnace and nozzle assembly, the combination of: a metal shell having a hole therethrough and surrounding a very hot chamber; a manifold secured to the outer side of said shell, said manifold having a fuel gas chamber therein; a pipe through which fuel gas may be supplied to said fuel gas chamber; an outer cylinder secured to the outer side of said manifold, the interior of said cylinder being in open communication with said fuel gas chamber; closing means on the outer end of said outer cylinder; an inner cylinder which is inside said outer cylinder and provides an annular space therebetween, such space communicating with said gas chamber; a piston sliding in said inner cylinder, the space inside said inner cylinder and between said closing means and said piston providing an outer cylinder space and being in open communication with said annular space between the cylinders; a burner tube rigidly connected to and movable with and by said piston and within said hole in said shell, said burner tube having an open bore connecting said outer cylinder space with said hole; and spring means tending to force said piston outwardly against gas in said fuel chamber.

4. An assembly as in claim 3 wherein said manifold includes a cooling water chamber between said gas chamber and said metal shell around said hole and in communication with said shell around said hole for cooling the shell.

5. A nozzle assembly adapted to deliver a fuel gas into a hot combustion chamber of a furnace through a hole in the wall of the combustion chamber, said assembly comprising: a manifold adapted to be secured to the outer surface of the wall of the furnace, said manifold having a closed fuel gas chamber, said manifold having a cooling water chamber adjacent one side of said fuel gas chamber and open at one side to be closed by such furnace wall to cool the latter; a fuel gas supply pipe connected to said fuel gas chamber and having a valve through which fuel gas may be delivered to said closed fuel gas chamber; a burner tube having an outer upper end and a lower end and extending through said fuel gas chamber and said water chamber and beyond said manifold to movably enter a hole in the wall of said combustion chamber, the upper end of said tube being open at all times to receive fuel gas from said fuel gas chamber and the lower end of said tube being open at all times; an inner cylinder in said closed fuel gas chamber, an open bottom of which is secured in gas-tight relationship in said manifold and passes said tube therethrough; and rigidly secured to the upper end of said burner tube, a piston which slides up and down in said inner cylinder through which fuel gas may pass into the cylinder above said piston.

6. In combination in a nozzle assembly adapted to deliver a fuel gas into a hot combustion chamber of a furnace through a hole therein: a furnace enclosing a combustion chamber and having a wall, there being a hole in the wall of the combustion chamber; a manifold secured to the outer surface of the wall of the furnace over said hole, said manifold having a closed fuel gas chamber; a fuel gas supply pipe connected to said fuel gas chamber and having a valve through which fuel gas may be delivered to said closed fuel gas chamber; burner tube movably passing through said manifold to be moved up and down in said hole, the upper end of said tube being open at all times to receive fuel gas from said fuel gas chamber and the lower end of said tube having a nozzle and being open at all times through said nozzle to the interior of the combustion chamber; an outer cylinder having a closed top and an open bottom which is secured in gas-tight relationship in an opening in the top of said manifold, said outer cylinder being so placed as to provide a gas-tight extension of said closed fuel gas chamber, said open bottom communicating with the interior of said manifold; an inner cylinder in said closed fuel gas chamber, an open bottom of which is secured in gas-tight relationship in said manifold but in open communication with said hole; and rigidly secured to the upper end of said burner tube, a piston which slides up and down in said inner cylinder with said tube and through which tube fuel gas may pass from a cylinder space above said piston, such cylinder space and said gas chamber with its extension being in open communication.

7. A combination as in claim 6 wherein said manifold has a water chamber between said gas chamber and said furnace wall, said wall closing the corresponding side of said water chamber to cool such wall adjacent said hole, said burner tube extending within and beyond said water chamber as it extends into said hole.

8. In combination: a furnace consisting of a gas-tight steel shell with a heat refractory lining inside said shell, said lining surrounding a combustion chamber, the walls of which may be at times at a temperature as high as 3000° F., there being a hole through said lining and steel shell; an enclosure secured to the outside of said shell and forming a gas-tight fuel chamber outside said shell around said hole; a cylinder inside said enclosure and having an inner end and an outer end, the inner end of which cylinder forms a gas-tight closure between said hole and said fuel chamber, the outer end of said cylinder being in open communication with said fuel chambers; a piston disposed in and slidable in gas-tight relationship with the inner wall of said cylinder; and a tube rigidly secured in gas-tight relationship to said piston and extending inwardly from said piston in such a position as to move into said combustion chamber through said hole as said piston moves inwardly, said tube having an opening extending therethrough which at all times connects said fuel chamber with said combustion chamber.

9. A combination as in claim 8 wherein said enclosure contains a water chamber around said tube, said water chamber being open to the adjacent wall of said shell to cool the latter adjacent said hole.

10. In combination with a burner assembly for a furnace: a shell; a heat refractory lining within said shell and enclosing a combustion chamber to be heated to a high temperature, there being a hole in said shell and a communicating hole in said refractory lining leading to said combustion chamber to supply fuel thereto; a manifold secured to the outside of said shell and covering the outer end of said shell hole, said manifold containing a fuel gas chamber; a gas pipe connected to said manifold for delivering fuel gas to said fuel gas chamber; valve means controlling the flow of gas through said gas pipe; a cylinder mounted in said manifold and having an inner end in communication with said combustion chamber and seated in said manifold, said cylinder having an outer end; a piston disposed in and slidable in said cylinder; a burner tube in said cylinder and having an inner end projecting into said holes, said tube having an outer end secured in said piston and open at its outer end to communicate with the outer end of said cylinder; means connecting said fuel gas chamber with the outer end of said cylinder; and spring means engaging said piston and tube for forcing the piston into said outer end of said cylinder when said valve means is closed.

11. A combination as in claim 10 including: a hollow retainer bushing seated in said manifold adjacent said shell to retain said manifold on said shell, said bushing having an outer end opening into said cylinder and having an inner end opening into said holes and providing a projection into said hole of said shell and securing said bushing and said manifold to said shell.

12. A combination as in claim 10 in which said manifold contains at its inner side a cooling water chamber exposed to said shell and placed about said hole in said shell to cool said shell adjacent such hole.

13. In combination in a burner assembly for a furnace and adapted to be mounted over a fuel hole in a furnace wall: a manifold adapted to be secured to the outside of a furnace wall and cover the outer end of a fuel hole therein, and having an opening to communicate with said hole, said manifold containing therein a fuel gas chamber; pipe means for delivering fuel gas to said fuel gas chamber; valve means for controlling the flow of gas through said pipe means; a cylinder mounted in said manifold and having an inner end seated in said manifold in communication with said opening, said cylinder having an outer end; a piston disposed in and slidable in said cylinder; a burner tube in said cylinder and projecting into said opening, said tube having an outer end secured in said piston and open at its outer end to communicate with the outer end of said cylinder beyond said piston; means connecting said fuel gas chamber with the outer end of said cylinder; spring means engaging said piston and tube for forcing said piston into said outer end of said cylinder and moving said tube in said opening when said gas valve is closed; and a mounting bushing disposed in said opening and having a retaining portion seated in a retaining seat in said manifold, said bushing having a passage therethrough receiving said burner tube and having an end projecting beyond said manifold to secure said bushing and said manifold to said wall.

References Cited in the file of this patent

UNITED STATES PATENTS

| | | |
|---|---|---|
| 901,597 | Doherty | Oct. 20, 1908 |
| 1,160,806 | Wuestner et al. | Nov. 16, 1915 |
| 2,047,523 | Scranton et al. | July 14, 1936 |
| 2,048,495 | Eaton et al. | July 21, 1936 |
| 2,287,245 | Hess | June 23, 1942 |
| 2,518,025 | Knight | Aug. 8, 1950 |
| 2,561,795 | Hess | July 24, 1951 |
| 2,689,001 | Leysen | Sept. 14, 1954 |